United States Patent
Hayashi et al.

(10) Patent No.: US 7,503,988 B2
(45) Date of Patent: Mar. 17, 2009

(54) METHOD OF MANUFACTURING IMAGE DISPLAY, IMAGE DISPLAY AND ADHESIVE OPTICAL FILM

(75) Inventors: Osamu Hayashi, Ibaraki (JP); Masayuki Satake, Ibaraki (JP); Akiko Ogasawara, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 798 days.

(21) Appl. No.: 10/541,285

(22) PCT Filed: Dec. 22, 2003

(86) PCT No.: PCT/JP03/16449

§ 371 (c)(1),
(2), (4) Date: Jul. 1, 2005

(87) PCT Pub. No.: WO2004/061805

PCT Pub. Date: Jul. 22, 2004

(65) Prior Publication Data

US 2006/0019091 A1    Jan. 26, 2006

(30) Foreign Application Priority Data

Jan. 7, 2003    (JP) .............................. 2003-000825

(51) Int. Cl.
*B32B 41/00* (2006.01)
(52) U.S. Cl. ........................... 156/64; 156/99; 156/106; 156/297; 156/299
(58) Field of Classification Search ............... 156/64, 156/99, 106, 297, 299, 360, 361, 367, 368
See application file for complete search history.

(56) References Cited

U.S. PATENT DOCUMENTS

| | | | |
|---|---|---|---|
| 5,838,415 A | 11/1998 | Hayashi et al. | |
| 5,892,561 A | 4/1999 | Suzuki et al. | |
| 6,552,771 B1 | 4/2003 | Inoue et al. | |
| 6,693,699 B2 | 2/2004 | Inoue et al. | |

FOREIGN PATENT DOCUMENTS

| | | |
|---|---|---|
| JP | 59-3421 | 1/1984 |
| JP | 9-113927 | 5/1997 |
| JP | 2000-235351 | 8/2000 |
| JP | 2001-42301 | 2/2001 |
| JP | 2001-42309 A | 2/2001 |

*Primary Examiner*—George R Koch, III
(74) *Attorney, Agent, or Firm*—Knobbe Martens Olson & Bear LLP (57) ABSTRACT

The invention is directed to a method of manufacturing an image display, comprising the step of sticking an adhesive optical film to an image display panel substrate surface having a display defect-inducible scratch, wherein the adhesive optical film is selected and used according to the image display panel such that the formula: $Y \times (0.97X + 0.45) > 0.19Z - 0.006$ is satisfied, wherein X (mm) is the amount of creep displacement one hour after a load of 500 g is applied at 23° C. to a 10 mm square of an adhesion area of the adhesive optical film stuck to the panel substrate, Y (mm) is the thickness of a pressure-sensitive adhesive layer of the adhesive optical film, and Z (mm) is a half length of the length of long side of the scratch of the image display panel substrate surface. According to the invention, a display defect, which would otherwise be caused by an scratch of the image display panel substrate, is avoided by filling the scratch with the pressure-sensitive adhesive layer of the adhesive optical film.

17 Claims, 1 Drawing Sheet

METHOD OF MANUFACTURING IMAGE DISPLAY, IMAGE DISPLAY AND ADHESIVE OPTICAL FILM

This application is the U.S. National Phase under 35 U.S.C. §371 of International Application PCT/JP2003/016449, filed Dec. 22, 2003, which claims priority to Japanese Patent Application No. 2003-825, filed Jan. 7, 2003. The International Application was not published under PCT Article 21(2) in English.

TECHNICAL FIELD

The invention relates to a method of manufacturing an image display, which is applicable with an image display panel having a scratch that can cause a display defect, and to an image display manufactured by the concerned method. The image display may be a liquid crystal display, an organic EL display, a PDP, or the like. The invention also relates to an adhesive optical film comprising an optical film and a pressure-sensitive adhesive layer which is provided on one side of the optical film so as to stick to a panel substrate of an image display panel. The optical film may be a polarizing film, a retardation film, a compensation film, a brightness enhancement film, an antiglare sheet, or a laminate of two or more thereof.

BACKGROUND ART

In liquid crystal displays, a polarizer is essentially placed on both side of panel substrates such as glass substrates, which form the outermost surfaces of a liquid crystal panel, for the image-forming mechanism, and a polarizing film is generally stuck to the outermost surface of the liquid crystal panel. Besides the polarizing film, various types of optical films have been used on the outermost surface of the liquid crystal panel to improve the display quality. Examples of such films include retardation films for coloring prevention, viewing angle expansion films for improving the viewing angle of liquid crystal displays, and brightness enhancement films for increasing the contrast of displays. These films are generically called optical films.

The surface of glass substrates for use in liquid crystal display panels can be physically scratched. When an optical film is stuck via a pressure-sensitive adhesive layer to glass substrates, such a scratch can form a void, which can cause display defects such as scattered bright spots. Scratches of glass substrates can often be produced during transportation. If the scratch is very large, the glass substrate should be rejected. When the glass substrate is subjected to a chemical treatment or a polishing process for the production of thin liquid crystal display panels, the scratch can become larger. If the scratch of the glass substrate is slight or lighter than a specified level, the glass substrate can be reproduced by polishing or surface treatment.

On the other hand, after a liquid crystal display panel is assembled with a glass substrate, the surface of the glass substrate can also be scratched during transportation or some processes. In such a case, it is difficult to reproduce the substrate in the above-mentioned manner. However, methods for reconditioning liquid crystal display panels have been investigated, because the liquid crystal display panels comprising glass substrates provided with transparent electrodes, oriented films and so on are a high extra value added product. For example, it is disclosed that a scratch that can cause a display defect on a liquid crystal display panel can be compensated or repaired with an adhesive optical member having controlled adhesion creep characteristics (for example, see JP-A No. 2001-42309). Using the disclosed adhesive optical member, display defect-inducible scratches at some levels can be compensated or repaired. However, there has been a demand for further refinements or improvements in the compensation or repair of display defect-inducible scratches.

DISCLOSURE OF INVENTION

It is an object of the invention to provide a method of manufacturing an image display in which display defects, which would otherwise be caused by a scratch of a panel substrate surface, are prevented by filling the display defect-inducible scratch of the panel substrate of an image display panel with a pressure-sensitive adhesive layer of an adhesive optical film.

It is another object of the invention to provide a display defect-free image display manufactured by the above method. It is another object of the invention to provide an adhesive optical film for use in methods of manufacturing image displays, which can avoid the display defects.

In order to solve the aforementioned problems, the inventors have made active investigations on the physical properties of pressure-sensitive adhesive layers of adhesive optical films. As a result, the inventors have found that the objects can be achieved using an adhesive optical film as described below and have completed the invention.

That is, the present invention is related to a method of manufacturing an image display, comprising the step of sticking an adhesive optical film to a surface of a panel substrate of an image display panel having a scratch that can cause a display defect, wherein the adhesive optical film comprises an optical film and a pressure-sensitive adhesive layer that is provided on one side of the optical film so as to be stuck to the panel substrate, and the adhesive optical film is selected and applied according to the image display panel such that the formula: $Y\times(0.97X+0.45)>0.19Z-0.006$ is satisfied, wherein X (mm) is an amount of creep displacement one hour after a load of 500 g is applied at 23° C. to a 10 mm square of an adhesion area of the adhesive optical film stuck to the panel substrate, Y (mm) is an thickness of the pressure-sensitive adhesive layer of the adhesive optical film, and Z (mm) is a half length of the length of long side of the scratch of the surface of the panel substrate of the image display panel.

And the present invention is related to an image display manufactured by the above method, comprising: a panel substrate of an image display panel, wherein a surface of the panel substrate has an scratch that can cause a display defect; and an adhesive optical film according to the image display panel is stuck to the surface of the panel substrate of the image display panel.

Further the present invention is related to an adhesive optical film for applied to the above method of manufacturing an image display, comprising an optical film and a pressure-sensitive adhesive layer that is provided on one side of the optical film so as to be stuck to a panel substrate of an image display panel, wherein the adhesive optical film satisfies the formula: $Y\times(0.97X+0.45)>0.19Z-0.006$, wherein X (mm) is an amount of creep displacement one hour after a load of 500 g is applied at 23° C. to a 10 mm square of an adhesion area of the adhesive optical film stuck to the panel substrate, Y (mm) is an thickness of the pressure-sensitive adhesive layer of the adhesive optical film, and Z (mm) is a half length of the length of long side of the scratch of the surface of the panel substrate of the image display panel.

(Working-Effects)

The inventors have concluded that display defects produced by scratches of the panel substrate surface of image display panel (for example, liquid crystal display panel) are attributable to a significant difference in refractive indexes between the panel (glass) and air and between air and an optical film and that if the pressure-sensitive adhesive forming the pressure-sensitive adhesive layer has sufficient softness so as to fill the scratch of the panel surface, the scratch of the panel can cause no display defect, because the pressure-sensitive adhesive layer forming the adhesive optical film for use has such a refractive index that the panel (glass) or other optical films are not affected. Thus, it has been found that if the amount (X mm) of the creep displacement concerning the physical properties of the adhesive optical film, the thickness (Y mm) of the pressure-sensitive adhesive layer and the half length of (Z mm) the length of long side of the scratch of the surface of the panel substrate satisfy the above formula, the process of filling the scratch of the panel substrate of the image display panel can be extremely effective in avoiding display defects.

Therefore, the adhesive optical film of the present invention for use is selected, according to a half length (Z mm) of the length of long side of the scratch of the panel substrate surface of the image display panel, such that the amount (X mm) of the creep displacement and the thickness (Y mm) of the pressure-sensitive adhesive layer satisfy the above formula.

The amount (X mm) of the creep displacement is the amount of displacement one hour after a load of 500 g is applied at 23° C. to a 10 mm square of the adhesion area on the panel substrate, and specifically, it is determined by the method as described in the examples. The amount (X mm) of the creep displacement is generally from 0.05 to 2 mm, more preferably from 0.075 to 1.5 mm, still more preferably from 0.1 to 1 mm. If it is less than 0.05 mm, the pressure-sensitive adhesive layer cannot have sufficient softness so that it can be difficult to sufficiently avoid display defects. On the other hand, a creep displacement amount of more than 2 mm is not preferred, because protrusion or leakage of the pressure-sensitive adhesive could easily occur in such a case.

The thickness (Y mm) of the pressure-sensitive adhesive layer is generally from 0.002 to 0.1 mm, more preferably from 0.005 to 0.06 mm, still more preferably from 0.01 to 0.04 mm. A thickness of less than 0.002 mm is not preferred, because such a thickness could easily cause peeling of the optical film. On the other hand, a thickness of more than 0.1 mm is not preferred, because protrusion or leakage of the pressure-sensitive adhesive could easily occur in such a case.

The half length (Z mm) of the length of long side of the scratch is a value obtained by dividing by 2 the length of long side of the scratch of the surface of the panel substrate of the image display panel. Specifically, the length of long side of the scratch is determined by the method as described in the examples. If the half length (Z mm) of the length of long side of the scratch is too long, it can be difficult to sufficiently avoid display defects in some cases. Thus, it should be generally 0.5 mm or less, more preferably 0.4 mm or less, still more preferably 0.3 mm or less for effective use.

BEST MODE FOR CARRYING OUT THE INVENTION

Any pressure-sensitive adhesive may be used to form the pressure-sensitive adhesive layer of the adhesive optical film of the invention, as long as the amount (X mm) of the creep displacement, the thickness (Y mm) of the pressure-sensitive adhesive layer and the half length (Z mm) of the length of long side of the scratch satisfy the above formula according to the panel substrate of the image display panel for use. The amount (X mm) of the displacement can be adjusted to any desired value by controlling the average molecular weight of the base polymer of the pressure-sensitive adhesive, the composition of the pressure-sensitive adhesive, the degree of crosslinking, or the like.

Examples of the pressure-sensitive adhesive include various types of pressure-sensitive adhesive such as rubber-based pressure-sensitive adhesives, acrylic pressure-sensitive adhesives, and silicone-based pressure-sensitive adhesives. In particular, pressure-sensitive adhesives containing an acrylic base polymer as a base polymer having a principle skeleton of an alkyl (meth)acrylate monomer unit and a multifunctional compound are preferably used. The acrylic polymer contains a monomer unit having a functional group capable of reacting with the multifunctional compound, and the acrylic polymer is crosslinked to the multifunctional compound in the pressure-sensitive adhesive layer. The term "(meth)acrylate" means an acrylate and/or a methacrylate, and "(meth)" has the same meaning in the description.

An average carbon number of alkyl groups of alkyl (meth) acrylates that constitute a principal skeleton of the acrylic polymer are about 1 to 12, and as examples of alkyl (meth) acrylates, there may be mentioned: methyl (meth)acrylates, ethyl (meth)acrylates, butyl (meth)acrylates, 2-ethyl hexyl (meth)acrylates, etc. These may be used independently, or may be used in combination.

The functional group-containing monomer may be a carboxyl group-containing monomer. Examples of the carboxyl group-containing monomer include acrylic acid, methacrylic acid, carboxyethyl acrylate, carboxypentyl acrylate, itaconic acid, maleic acid, fumaric acid, and crotonic acid; and acid anhydride monomers such as maleic anhydride and itaconic anhydride.

Examples of the functional group-containing monomer also include hydroxyl group-containing monomers such as 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphoric acid group-containing monomers such as 2-hydroxyethylacryloyl phosphate.

Examples of the monomer also include N-substituted amide monomers such as (meth)acrylamide, N,N-dimethyl (meth)acrylamide, N,N-diethyl(meth)acrylamide, N-butyl (meth)acrylamide, N-methylol(meth)acrylamide, and N-methylolpropane(meth)acrylamide; alkylaminoalkyl (meth) acrylate monomers such as aminoethyl (meth)acrylate, N,N-dimethylaminoethyl (meth)acrylate, and tert-butylaminoethyl (meth)acrylate; alkoxyalkyl (meth)acrylate monomers such as methoxyethyl (meth)acrylate and ethoxyethyl (meth)acrylate; maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimde, N-cyclohexylitaconimide, and N-laurylitaconimide; and succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide.

Examples of the monomer also include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amide, styrene, α-methylstyrene, and N-vinylcaprolactam; cyano group-containing monomers such as acrylonitrile and methacrylonitrile; epoxy group-containing acrylic monomers such as glycidyl (meth)acrylate; glycol (meth)acrylates such as polyethylene glycol (meth) acrylate, polypropylene glycol (meth)acrylate, methoxyethylene glycol (meth)acrylate, and methoxypolypropylene glycol (meth)acrylate; and (meth)acrylates such as tetrahydrofurfuryl (meth)acrylate, fluoro(meth)acrylates, silicone (meth)acrylate, 2-methoxyethyl acrylate, and (meth) acryloylmorpholine. The content of the functional group-containing monomer unit in the acrylic polymer may be any value.

The acrylic polymer may have any average molecular weight, its weight average molecular weight is preferably about from 300000 to 3000000, more preferably from 400000 to 2500000, particularly preferably from 600000 to 2500000. The weight average molecular weight is measured by GPC.

The acrylic polymer may be manufactured using suitably selected various well-known methods, for example, radical-polymerization methods, such as a bulk polymerization method, a solution-polymerization method, and a suspension-polymerization method. As radical polymerization initiators, various kinds of well known azo based and peroxide based polymerization initiators may be used. Reaction temperatures are usually about 50 to 85° C., and reaction time is about 1 to 8 hours. Moreover, also among the manufacturing methods, a solution-polymerization method is preferable, and polar solvents, such as ethyl acetate and toluene, are generally used as solvents for acrylic polymers. Solution concentrations are usually about 20 to 80% by weight.

As multifunctional compounds, organic crosslinking agents and multifunctional metal chelates that may be crosslinked with the acrylic polymer may be mentioned. As organic based crosslinking agents, epoxy based crosslinking agents, isocyanate based crosslinking agents, imine based crosslinking agents, etc. that is having at least two functional group in a molecule reacting with functional groups such as carboxyl group, hydroxyl group, may be mentioned. As organic based crosslinking agents, isocyanate based crosslinking agents are preferable.

Multifunctional metal chelates are substances having polyvalent metals that have a coordinate bond or a covalent bond with organic compounds. As polyvalent metal atoms, Al, Cr, Zr, Co, Cu, Fe, Ni, V, Zn, In, Ca, Mg, Mn, Y, Ce, Sr, Ba, Mo, La, Sn, Ti, etc. may be mentioned. Among these, Al, Zr, Ti is preferable. An oxygen atom etc. may be mentioned as an atom in organic compounds constituting a covalent bond or a coordinate bond, and as organic compounds, alkyl esters, alcohol compounds, carboxylic acid compounds, ether compounds, ketone compounds, etc. may be mentioned.

The blend ratio of the acrylic polymer and the multifunctional compound may be any desired value and may be determined depending on the content and type of the functional group-containing monomer unit in the acrylic polymer, the type of the multifunctional compound, and the like.

Furthermore, to the pressure sensitive adhesive composition, if necessary, there may suitably be used tackifiers, plasticizers, fillers, antioxidants, ultraviolet absorbers, silane coupling agents etc. Moreover, various kinds of additives in a range that does not depart from purposes of the invention may also be suitably used.

Figure 1:
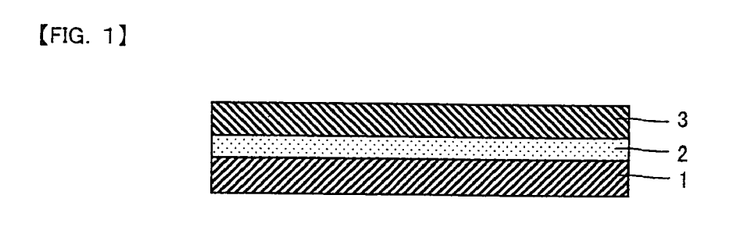
FIG. 1 is a cross-sectional view showing an example of the adhesive optical film of the invention.

As shown in FIG. 1, the adhesive optical film of the invention comprises an optical film 1 and a pressure-sensitive adhesive layer 2 that is provided on one side of the optical film 1 so as to stick to a panel substrate (preferably a glass substrate) of an image display panel. A releasable sheet 3 may be provided on the pressure-sensitive adhesive layer 2.

Any type of optical film for liquid crystal displays or the like may be used as the optical film 1. For example, the optical film may be a polarizing film (a polarizing plate). A commonly used type of polarizing film comprises a polarizer and a transparent protective film provided on one or both sides of the polarizer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared in one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. The transparent film can be formed as a cured layer made of heat curing type or ultraviolet ray curing type resins, such as acryl based, urethane based, acryl urethane based, epoxy based, and silicone based. In general, a thickness of the transparent protective film is 500 µm or less, preferably from 1 to 300 µm, and especially preferably from 5 to 200 µm.

As the transparent protective film, if polarization property and durability are taken into consideration, cellulose based polymer, such as triacetyl cellulose, is preferable, and especially triacetyl cellulose film is suitable. In addition, when transparent protective films are provided on both sides of the polarizer, transparent protective films comprising same polymer material may be used on both of a front side and a back side, and transparent protective films comprising different polymer materials etc. may be used.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the transparent protective film may have as little coloring as possible. Accordingly, a protective film having a phase difference value in a film thickness direction represented by Rth=[(nx+ny)/2−nz]×d of from −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protection film having a phase difference value (Rth) of from −90 nm to +75 nm in a thickness direction. The phase difference value (Rth) in a thickness direction is preferably from −80 nm to +60 nm, and especially preferably from −70 nm to +45 nm.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Isocyanate based adhesives, polyvinyl alcohol based adhesives, gelatin based adhesives, vinyl based latex based, aqueous polyester based adhesives, and etc. may be used for adhesion processing for the above-mentioned polarizers and transparent protective films.

An optical film of the invention may be used in practical use as a polarizing plate laminated with other optical layers. Although there is especially no limitation about the optical layers, one layer or two layers or more of optical layers, which may be used for formation of a liquid crystal display etc., such as a reflective plate, a transreflective plate, a retardation plate (a half wavelength plate and a quarter wavelength plate included), and a viewing angle compensation film, may be used. Especially preferable polarizing plates are; a reflection type polarization plate or a transreflective type polarization plate in which a reflective plate or a transreflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transreflective type polarizing plate may be obtained by preparing the above-mentioned reflective layer as a transreflective type reflective layer, such as a half-mirror etc. that reflects and transmits light. A transreflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transreflective type polarization plate. That is, the transreflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 20 to 150 µm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain skeleton, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transreflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

The pressure-sensitive adhesive layer 2 may be formed on the optical film 1 by any method such as a method of applying and drying a pressure-sensitive adhesive composition (solution) and a method of providing the releasable sheet 3 having the pressure-sensitive adhesive layer 2 and transferring the pressure-sensitive adhesive layer 2 from the releasable sheet 3.

As a releasable sheet 3 material, papers, plastics films such as polyethylene polypropylene, rubber sheets, cloths, no woven fabrics, nets, foamed sheets and metallic foils or laminated sheets thereof may be used. As a surface of the releasable sheet 3, if necessary, peeling treatment such as silicone type, long chain alkyl type, fluorine type, may be performed.

In addition, in the present invention, ultraviolet absorbing property may be given to the above-mentioned each layer of the adhesive optical film of the invention, such as the optical film 1, and the adhesive layer etc., using a method of adding UV absorbents, such as salicylic acid ester type compounds, benzophenol type compounds, benzotriazol type compounds, cyano acrylate type compounds, and nickel complex salt type compounds.

Preferably, the adhesive optical film of the invention is stuck on the surface of the image display panel substrate (preferably a glass substrate) having a display defect-inducible scratch when used to form various types of image displays. For example, the image displays are liquid crystal displays.

Figure 2:
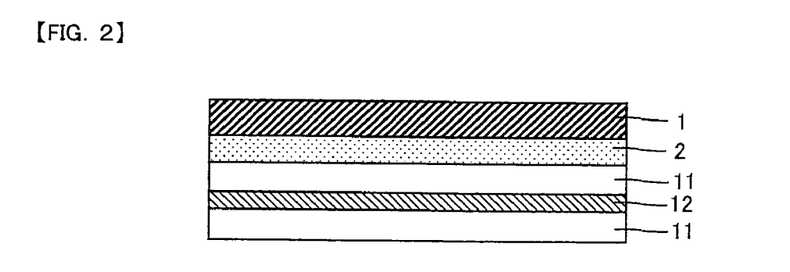
FIG. 2 is a cross-sectional view showing an example of the adhesive optical film of the invention stuck to one side of a panel.

The liquid crystal display panel to be repaired may be of any type. As shown in FIG. 2, for example, the liquid crystal display panel to be repaired comprises two panel substrates 11 and a liquid crystal layer 12 sealed between them. In terms of alignment mode of liquid crystal, the liquid crystal display panel may be of twisted type or untwisted type such as TN type, STN type, vertical alignment type, HAN type, and OCB type, or guest-host type or ferroelectric liquid crystal type. Various types of drive systems of liquid crystal may be used without limitation, for example, including an active matrix system and a passive matrix system.

The liquid crystal display panel to be repaired has a display defect-inducible scratch on one or both of the outermost surfaces of the panel substrates 11. The panel substrates 11 may be, for example, a glass substrate, a resin substrate (such as an acrylic plate and a bakelite plate), or a substrate having a hard coat layer on its surface. The liquid crystal display panel typically comprises a liquid crystal layer sealed between panel substrates having transparent electrodes, oriented films and so on.

Assembling of a liquid crystal display may be carried out according to conventional methods. That is, a liquid crystal display is generally manufactured by suitably assembling several parts such as a liquid crystal panel, adhesive optical films and, if necessary, lighting system, and by incorporating driving circuit. In the present invention, except that an adhesive optical film by the present invention is used, there is especially no limitation to use any conventional methods.

Suitable liquid crystal displays, such as liquid crystal display with which the above-mentioned optical film has been located at one side or both sides of the liquid crystal panel, and with which a backlight or a reflective plate is used for a lighting system may be manufactured. In this case, the adhesive optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The invention is more specifically described by means of the examples below, which are not intended to limit the scope of the invention. In each example, the term "part or parts" means part or parts by weight.

Example 1

(Preparation of Pressure-sensitive Adhesive)

In 100 pats of ethyl acetate, 100 parts of butyl acrylate, 0.2 parts of 2-hydroxyethyl acrylate, 2 parts of acrylic acid, and 2 parts of azobisisobutyronitrile were allowed to react under stirring at 60° C. for 10 hours to form a solution of an acrylic polymer with a weight average molecular weight of 1300000. Based on 100 parts of the polymer solid, 0.5 parts of an isocyanate type crosslinking agent (Coronate L manufactured by Nippon Polyurethane Co., Ltd.) was added to the polymer solution to prepare a pressure-sensitive adhesive solution.

(Preparation of Adhesive Optical Film)

An 80 µm-thick polyvinyl alcohol film was stretched to five times in an aqueous iodine solution and then dried. A triacetyl cellulose film was adhered with an adhesive to both sides of the stretched film to form a polarizing film.

The prepared pressure-sensitive adhesive solution was applied to a releasable film so as to form a 40 µm-thick pressure-sensitive adhesive layer after drying. The releasable film comprises a 35 µm-thick polyethylene terephthalate film and a surface coat of a silicone release agent formed on the film. The releasable film with the pressure-sensitive adhesive layer and the prepared polarizing film were laminated to form an adhesive polarizing film.

Example 2

(Preparation of Pressure-sensitive Adhesive)

A pressure-sensitive adhesive solution was prepared using the process of Example 1 except that the amount of the crosslinking agent was changed to 0.3 parts.

(Preparation of Adhesive Optical Film)

An adhesive polarizing film was prepared using the process of Example 1 except that the above prepared pressure-sensitive adhesive solution was used to form a 25 µm-thick pressure-sensitive adhesive layer.

Example 3

(Preparation of Pressure-sensitive Adhesive)

In 100 parts of ethyl acetate, 80 parts of 2-ethylhexyl acrylate, 19 parts of butyl acrylate, 1 part of 4-hydroxybutyl acrylate, and 2 parts of azobisisobutyronitrile were allowed to react under stirring at 60° C. for 10 hours to form a solution of an acrylic polymer with a weight average molecular weight of 1200000. Based on 100 parts of the polymer solid, 0.05 parts of an isocyanate type crosslinking agent (Coronate L manufactured by Nippon Polyurethane Co., Ltd.) was added to the polymer solution to form a pressure-sensitive adhesive solution.

(Preparation of Adhesive Optical Film)

An adhesive polarizing film was prepared using the process of Example 1 except that the above prepared pressure-sensitive adhesive solution was used to form a 15 μm-thick pressure-sensitive adhesive layer.

Comparative Example 1

(Preparation of Adhesive Optical Film)

An adhesive polarizing film was prepared using the process of Example 1 except that the thickness of the pressure-sensitive adhesive layer was set at 30 μm.

Comparative Example 2

The adhesive polarizing film as prepared in Example 2 was used except that a glass substrate used in evaluation had a scratch whose length of long side was different from that in Example 2.

Comparative Example 3

(Preparation of Pressure-sensitive Adhesive)

A pressure-sensitive adhesive solution was prepared using the process of Example 3 except that the amount of the crosslinking agent was changed to 1 part.

(Preparation of Adhesive Optical Film)

An adhesive polarizing film was prepared using the process of Example 3 except that the above prepared pressure-sensitive adhesive solution was used.

The adhesive polarizing films prepared in the examples and the comparative examples were evaluated as described below. The results of the evaluation are shown in Table 1.

(Amount (X mm) of Creep Displacement)

Figure 3A:
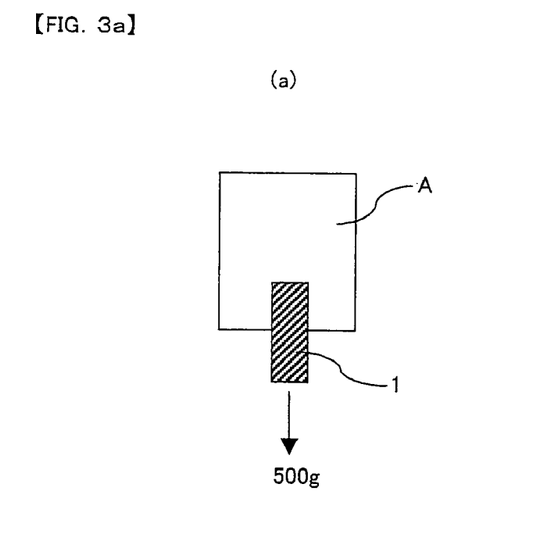
FIGS. 3(a) and 3(b) are front and side views, respectively, schematically showing the measurement of the amount of creep displacement of the adhesive optical film.
Figure 3B:
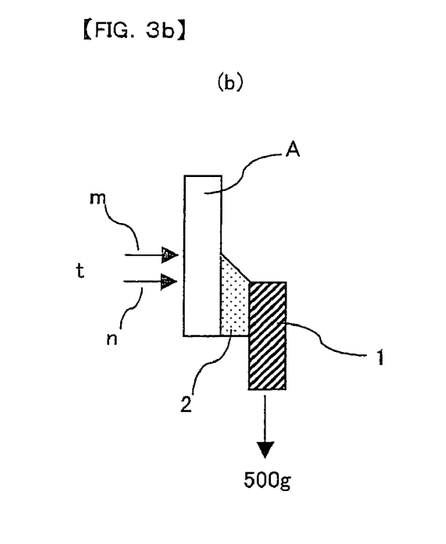

A 10 mm×50 mm size cut of each adhesive polarizing film was stuck to a 10 mm square of an adhesion area of a glass plate (Alkali-free glass 1737 manufactured by Corning, Inc.) and allowed to stand under a pressure of 5 atmospheres at 50° C. for 30 minutes in an autoclave. Thereafter, a load of 500 g was applied thereto at 23° C. in the vertical direction, and the amount of displacement (mm) was measured one hour later. The measurement is illustrated in detail in FIG. 3. Reference mark A represents a bake plate, m the initial adhesion position, n the adhesion position after one hour, and t the amount of displacement (mm). The results are shown in Table 1.

(Display Characteristics)

Each adhesive polarizing film was stuck to the surface of a glass substrate having, on its surface, a scratch whose length of long side was as shown in Table 1. The length of long side was measured by magnifying the scratch with a microscope, a CCD camera or the like, and Z is half length of the length of long side.

Another adhesive optical member was stuck to the other side of the glass plate such that the polarizing film was in a cross nicol position. The product was then subjected to an autoclave treatment under a pressure of 5 atmospheres at 50° C. for 30 minutes. Thereafter, the product was placed on a backlight, and light leakage was evaluated with the following criteria.

○: The scratch was completely filled and no display defect occurred.

×: The scratch was not completely filled and display defect occurred.

TABLE 1

| | Amount of Creep Displacement (mm): X | Thickness of Pressure-sensitive adhesive layer (mm): Y | Half Length of the Length of long side of Scratch (mm): Z | Display Defect |
|---|---|---|---|---|
| Example 1 | 0.08 | 0.040 | 0.13 | ○ |
| Example 2 | 0.15 | 0.025 | 0.07 | ○ |
| Example 3 | 0.50 | 0.015 | 0.08 | ○ |
| Comparative Example 1 | 0.08 | 0.030 | 0.13 | × |
| Comparative Example 2 | 0.15 | 0.025 | 0.14 | × |
| Comparative Example 3 | 0.10 | 0.015 | 0.08 | × |

INDUSTRIAL APPLICABILITY

According to the method of manufacturing the image display of the invention, display defects, which would otherwise be caused by an scratch of the surface of a panel substrate of an image display panel for a liquid crystal display, an organic EL (electro-luminescent) display, a PDP (PLASMA DISPLAY PANEL), or the like, can be avoided by filling the scratch with the pressure-sensitive adhesive layer of the adhesive optical film.

The invention claimed is:

1. A method of manufacturing an image display, comprising the step of sticking an adhesive optical film to a surface of a panel substrate of an image display panel having a scratch that can cause a display defect, wherein the adhesive optical film comprises an optical film and a pressure-sensitive adhesive layer that is provided on one side of the optical film so as to be stuck to the panel substrate, and the adhesive optical film is selected and applied according to the image display panel such that the formula: Y×(0.97X+0.45)>0.19Z−0.006 is satisfied, wherein X (mm) is an amount of creep displacement one hour after a load of 500 g is applied at 23° C. to a 10 mm square of an adhesion area of the adhesive optical film stuck to the panel substrate, Y (mm) is an thickness of the pressure-sensitive adhesive layer of the adhesive optical film, and Z (mm) is a half length of the length of long side of the scratch of the surface of the panel substrate of the image display panel.

2. An image display manufactured by the method of according to claim 1, comprising: a panel substrate of an image display panel, wherein a surface of the panel substrate has an scratch that can cause a display defect; and an adhesive optical film according to the image display panel is stuck to the surface of the panel substrate of the image display panel.

3. An adhesive optical film for applied to the method of manufacturing an image display of according to claim 1, comprising an optical film and a pressure-sensitive adhesive layer that is provided on one side of the optical film so as to be stuck to a panel substrate of an image display panel, wherein the adhesive optical film satisfies the formula: Y×(0.97X+0.45)>0.19Z−0.006, wherein X (mm) is an amount of creep displacement one hour after a load of 500 g is applied at 23° C. to a 10 mm square of an adhesion area of the adhesive optical film stuck to the panel substrate, Y (mm) is an thickness of the pressure-sensitive adhesive layer of the adhesive optical film, and Z (mm) is an half length of the length of long side of the scratch of the surface of the panel substrate of the image display panel.

4. A method of manufacturing an image display, comprising:

provi­ding a panel substrate of an image display having a scratch that can cause a display defect, said scratch having a longitudinal length, 2Z (mm); and providing an adhesive optical film comprising (i) an optical film and (ii) a pressure-sensitive adhesive layer provided on one side of the optical film to be stuck to the panel substrate, said pressure-sensitive adhesive layer having a thickness of Y (mm);

determining X (mm) which is an amount of creep displacement as measured one hour after a load of 500 g is applied at 23° C. to a 10 mm square of an adhesion area of the adhesive optical film stuck to a sample of the panel substrate; and sticking the adhesive optical film to a surface of the panel substrate if the adhesive optical film satisfies the formula: $Y \times (0.97X+0.45) > 0.19Z - 0.006$.

5. The method according to claim 4, wherein X ranges from 0.05 mm to 2 mm, Y ranges from 0.002 mm to 0.1 mm, and Z is 0.5 mm or less.

6. The method according to claim 5, wherein X ranges from 0.1 mm to 1 mm, Y ranges from 0.01 mm to 0.04 mm, and Z is 0.3 mm or less.

7. The method according to claim 4, wherein the panel substrate is a glass substrate.

8. The method according to claim 4, wherein the optical film is a polarizing film.

9. The method according to claim 4, wherein the image display is a liquid crystal display.

10. The method according to claim 4, wherein the adhesive layer is selected from the group consisting of isocyanate adhesives, polyvinyl alcohol adhesives, gelatin adhesives, vinyl latex adhesives, and aqueous polyester adhesives.

11. A method of repairing a display defect of an image display panel, comprising:

determining a longitudinal length, 2Z (mm), of a scratch present on a panel substrate of the image display panel, which can cause a display defect;

providing an adhesive optical film comprising (i) an optical film and (ii) a pressure-sensitive adhesive layer provided on one side of the optical film to be stuck to the panel substrate;

determing the formula: $Y \times (0.97X+0.45) > 0.19Z - 0.006$, wherein X (mm) is an amount of creep displacement as measured one hour after a load of 500 g is applied at 23° C. to a 10 mm square of an adhesion area of the adhesive optical film stuck to a sample of the panel substrate, and Y (mm) is an thickness of the pressure-sensitive adhesive layer of the adhesive optical film;

selecting the adhesive optical film if the formula is satisfied; and sticking the adhesive optical film to a surface of the panel substrate.

12. The method according to claim 11, wherein X ranges from 0.05 mm to 2 mm, Y ranges from 0.002 mm to 0.1 mm, and Z is 0.5 mm or less.

13. The method according to claim 12, wherein X ranges from 0.1 mm to 1 mm, Y ranges from 0.01 mm to 0.04 mm, and Z is 0.3 mm or less.

14. The method according to claim 11, wherein the panel substrate is a glass substrate.

15. The method according to claim 11, wherein the optical film is a polarizing film.

16. The method according to claim 11, wherein the image display is a liquid crystal display.

17. The method according to claim 11, wherein the adhesive layer is selected from the group consisting of isocyanate adhesives, polyvinyl alcohol adhesives, gelatin adhesives, vinyl latex adhesives, and aqueous polyester adhesives.

* * * * *

UNITED STATES PATENT AND TRADEMARK OFFICE
CERTIFICATE OF CORRECTION

PATENT NO. : 7,503,988 B2  Page 1 of 1
APPLICATION NO. : 10/541285
DATED : March 17, 2009
INVENTOR(S) : Osamu Hayashi et al.

It is certified that error appears in the above-identified patent and that said Letters Patent is hereby corrected as shown below:

At Column 7, Lines 8-9, please delete "polymers,such" and insert --polymers, such--, therefor.

At Column 7, Line 41, please delete "sidechain" and insert --side chain--, therefor.

At Column 18, Line 51, in Claim 2, after "method", please delete "of".

At Column 18, Line 58, in Claim 3, after "display", please delete "of".

At Column 20, Line 10, in Claim 11, please delete "determing" and insert --determining--, therefor.

Signed and Sealed this

Sixteenth Day of November, 2010

David J. Kappos
*Director of the United States Patent and Trademark Office*